H. URIE.
SICKLE BAR AND PITMAN ROD CONNECTOR.
APPLICATION FILED AUG. 28, 1912. RENEWED MAR. 3, 1915.
1,141,731.
Patented June 1, 1915.
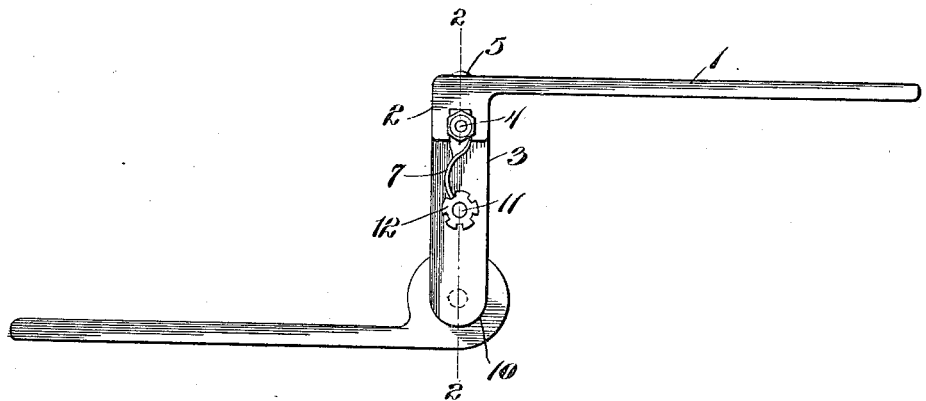
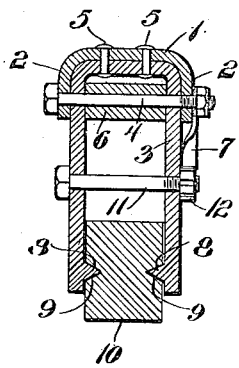
Inventor
Howard Urie
Witnesses
Wm. H. Mulligan.
By Victor J. Evans.
Attorney

UNITED STATES PATENT OFFICE.

HOWARD URIE, OF TWIN FALLS, IDAHO.

SICKLE-BAR AND PITMAN-ROD CONNECTOR.

1,141,731.  Specification of Letters Patent.  Patented June 1, 1915.

Application filed August 28, 1912, Serial No. 717,537. Renewed March 3, 1915. Serial No. 11,877.

*To all whom it may concern:*

Be it known that I, HOWARD URIE, a citizen of the United States, residing at Twin Falls, in the county of Twin Falls and State of Idaho, have invented new and useful Improvements in Sickle-Bar and Pitman-Rod Connectors, of which the following is a specification.

This invention relates to sickle bar and pitman rod connectors and the object of the invention is to provide a simple and efficient device of this character wherein the wear may be readily taken up in the bearing between the parts and the sickle bar when necessary.

Further objects of this invention will appear as the following specific description is read in connection with the accompanying drawing, which forms a part of this application, and in which:—

Figure 1 is a side elevation. Fig. 2 is a vertical sectional view on the line 2—2 of Fig. 1.

Referring more particularly to the drawing, 1 represents an ordinary pitman which is provided at its ends with a pair of parallel spaced ears 2, between which is secured a yoke-shaped bearing member 3 by means of the bolt 4 and the rivets 5. The bolt 4 also holds a spacing block 6 between the legs of the yoke-shaped member 3 and secures a spring locking dog 7 to the yoke member. Projecting inwardly in opposite directions from the legs of the yoke-shaped member are bearing cones 8 which are adapted to engage similar sockets 9 formed in the head 10 of the sickle bar. Passing through the legs of the yoke member 3 above the head 10 is a bolt 11 having a notched adjusting nut 12 arranged thereon adapted to be engaged by the spring pawl 7. By securing the nut on the bolt, the legs of the yoke shaped member 3 will be brought into closer engagement with the head 10 so as to take up any lost motion through wear of the parts. It will be noticed that the pivotal engagement of the parts permits free vertical movement of the sickle bar and that the construction is extremely simple throughout.

What is claimed is:—

A device of the class described, including a pair of members, a connector for said members, said connector comprising a yoke-shaped member consisting of a pair of vertically disposed parallel spaced legs, bearings on the inner faces of the legs and engaging with the terminal of one of said members for establishing pivotal connection between said members, a horizontal cross bar formed integral with and connecting the upper extremities of said legs, a bolt passing through the legs at a point medially thereof for retaining the bearings in engagement with said last named member, means securing one end of the other of said members to the cross bar, one of said members having a pair of downwardly extending and relatively spaced ears for embracing the legs of the connector, a spacing block located between the legs of the connector at a point above and in spaced parallel relation with said bolt, and another bolt passing through the said ears, legs and block.

In testimony whereof I affix my signature in presence of two witnesses.

HOWARD URIE.

Witnesses:
J. H. WISE,
ELEANOR B. TAYLOR.

Copies of this patent may be obtained for five cents each, by addressing the "Commissioner of Patents, Washington, D. C."